(12) United States Patent
Uehara et al.

(10) Patent No.: US 9,164,361 B2
(45) Date of Patent: Oct. 20, 2015

(54) IMAGING DEVICE HOLDING UNIT AND LENS BARREL EACH HAVING HOLDER MEMBER FOR IMAGING DEVICE PACKAGE, AND IMAGE PICKUP APPARATUS HAVING HOLDING UNIT OR LENS BARREL

(71) Applicant: CANON KABUSHIKI KAISHA, Tokyo (JP)

(72) Inventors: Takumi Uehara, Kawasaki (JP); Shuichi Terada, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 13/721,188

(22) Filed: Dec. 20, 2012

(65) Prior Publication Data

US 2013/0162860 A1      Jun. 27, 2013

(30) Foreign Application Priority Data

Dec. 26, 2011   (JP) ................... 2011-283636

(51) Int. Cl.
   *G03B 17/56*   (2006.01)
   *H04N 5/225*   (2006.01)
   (Continued)

(52) U.S. Cl.
   CPC .............. *G03B 17/561* (2013.01); *G02B 7/102* (2013.01); *G03B 17/04* (2013.01); *G03B 17/12* (2013.01); *G03B 17/17* (2013.01); *H04N 5/225* (2013.01); *H04N 5/2251* (2013.01); *G03B 2217/002* (2013.01)

(58) Field of Classification Search
   CPC ...... G03B 17/561; G03B 17/04; G03B 17/12; G03B 17/17; H04N 5/2251; H04N 5/225; G02B 7/102

USPC .................................................. 348/373–375
See application file for complete search history.

(56) References Cited

U.S. PATENT DOCUMENTS 7,250,972 B2 *   7/2007   Oshima .................... 348/373
7,710,496 B2 *   5/2010   Schomann et al. ....... 348/373
(Continued)

FOREIGN PATENT DOCUMENTS

CN          1609647 A       4/2005
CN        102055889 A       5/2011
(Continued)

OTHER PUBLICATIONS

Japanese Office Action cited in Japanese counterpart application No. JP2011-283636, dated Oct. 22, 2013.

(Continued)

*Primary Examiner* — Gevell Selby
(74) *Attorney, Agent, or Firm* — Rossi, Kimms & McDowell LLP

(57) ABSTRACT

A lens barrel having a holder member that holds an imaging device package and allowing one or more structure members other than the holder member to be disposed around the package. The imaging device package in which an imaging device is housed is held by the holder member having planar portions that are disposed parallel to the package and that are coupled to each other through raised bent portions. The raised bent portions of the holder member are disposed so as to be overlapped with and inside the package as seen from an optical axis direction, thereby obtaining a free space around the package, in which one or more structural members other than the holder member can be disposed.

6 Claims, 17 Drawing Sheets

(51) Int. Cl.
  *G03B 17/04*  (2006.01)
  *G03B 17/12*  (2006.01)
  *G03B 17/17*  (2006.01)
  *G02B 7/10*  (2006.01)

(56) References Cited

U.S. PATENT DOCUMENTS

| | | | |
|---|---|---|---|
| 2005/0024528 A1* | 2/2005 | Kurosawa | 348/375 |
| 2005/0083590 A1* | 4/2005 | Tanigawa et al. | 359/819 |
| 2011/0102988 A1* | 5/2011 | Matsuo | 361/679.01 |
| 2011/0205378 A1* | 8/2011 | Kobayashi | 348/208.11 |

FOREIGN PATENT DOCUMENTS

| | | |
|---|---|---|
| CN | 102169274 A | 8/2011 |
| JP | 2010-147753 A | 7/2010 |
| JP | 2011-097415 A | 5/2011 |
| JP | 2011-135217 A | 7/2011 |

OTHER PUBLICATIONS

Chinese Office Action issued in Chinese counterpart application No. CN201210571409.X, dated Jan. 23, 2015. English translation provided.

Chinese Office issued in Chinese counterpart application no. CN201210571409X, dated Jun. 15, 2015. English translation provided.

* cited by examiner

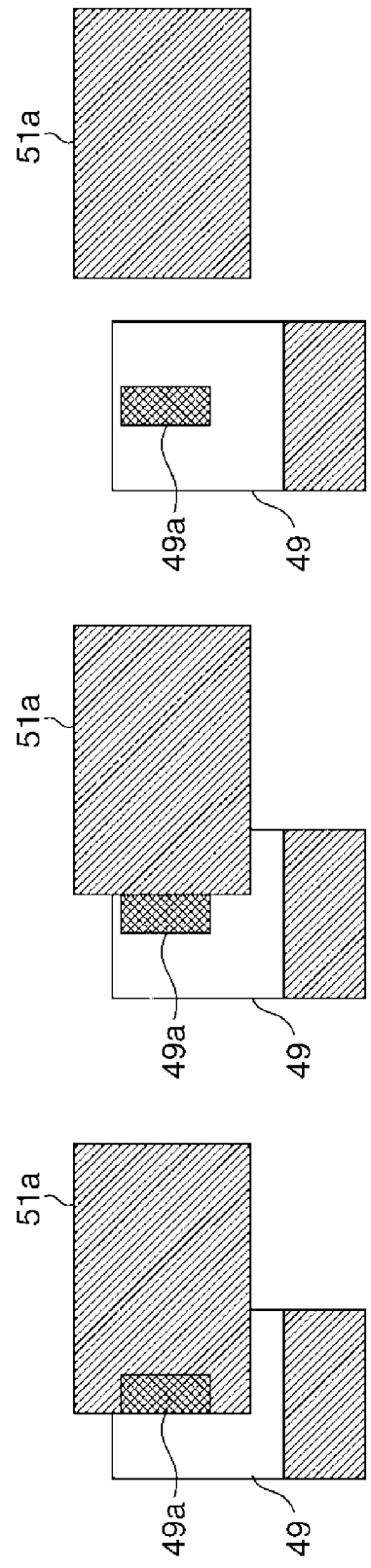

IMAGING DEVICE HOLDING UNIT AND LENS BARREL EACH HAVING HOLDER MEMBER FOR IMAGING DEVICE PACKAGE, AND IMAGE PICKUP APPARATUS HAVING HOLDING UNIT OR LENS BARREL

BACKGROUND OF THE INVENTION

1. Field of the Invention

The present invention relates to an imaging device holding unit and a lens barrel each having a holder member that holds an imaging device package, an image pickup apparatus having the imaging device holding unit, and an image pickup apparatus having the lens barrel.

2. Description of the Related Art

Conventionally, an imaging apparatus has been proposed that includes a lens barrel in which an imaging device is held by a holder member formed into a shape that surrounds peripheral four sides of the imaging device (see, for example, Japanese Laid-open Patent Publication No. 2011-135217).

However, when an imaging device or an imaging device package that incorporates an imaging device is held by a holder member formed into the aforesaid shape, most space around the imaging device or around the imaging device package is occupied by the holder member. This poses a problem that a structural member other than the holder member cannot be disposed around the imaging device or around the imaging device package. Such problem becomes noticeable especially in an image pickup apparatus that is made compact in size.

SUMMARY OF THE INVENTION

The present invention provides an imaging device holding unit and a lens barrel each having a holder member that holds an imaging device package and allowing one or more structural members other than the holder member to be disposed around the package, and provides an image pickup apparatus having the imaging device holding unit and an image pickup apparatus having the lens barrel.

According to one aspect of this invention, there is provided a lens barrel comprising an optical system disposed along an optical axis, an imaging device housed in a package and configured to photoelectrically convert object light formed into an image by the optical system into an electrical signal, an imaging sensor base plate configured to be mounted with a circuit that performs image processing on an output signal of the imaging device, and a holder member configured to support the package, wherein the holder member has planar portions disposed on both sides of the optical axis, respectively, so as to face each other and parallel to the package, and has raised bent portions through which the planar portions are coupled to each other, and the raised bent portions of the holder member are disposed so as to be overlapped with and inside the package as seen from a direction of the optical axis.

With this invention, the raised bent portions of the holder member that holds the imaging device package are disposed to be overlapped with and inside the package as seen from the optical axis direction, and therefore, a free space can be obtained around the imaging device package, even if the image pickup apparatus is made compact. As a result, one or more structural members other than the holder member can be disposed around the package.

Further features of the present invention will become apparent from the following description of an exemplary embodiment with reference to the attached drawings.

BRIEF DESCRIPTION OF THE DRAWINGS

FIG. 12A is a schematic view showing a state where a light receiving sensor of a photointerrupter is light-shielded by a light shield plate;

FIG. 12B is a schematic view showing a state where the light receiving sensor is partly light-shielded by the light shield plate;

FIG. 12C is a schematic view showing a state where the light receiving sensor is not light-shielded by the light shield plate;

DESCRIPTION OF THE EMBODIMENTS

The present invention will now be described in detail below with reference to the drawings showing a preferred embodiment thereof.

Figure 1A:
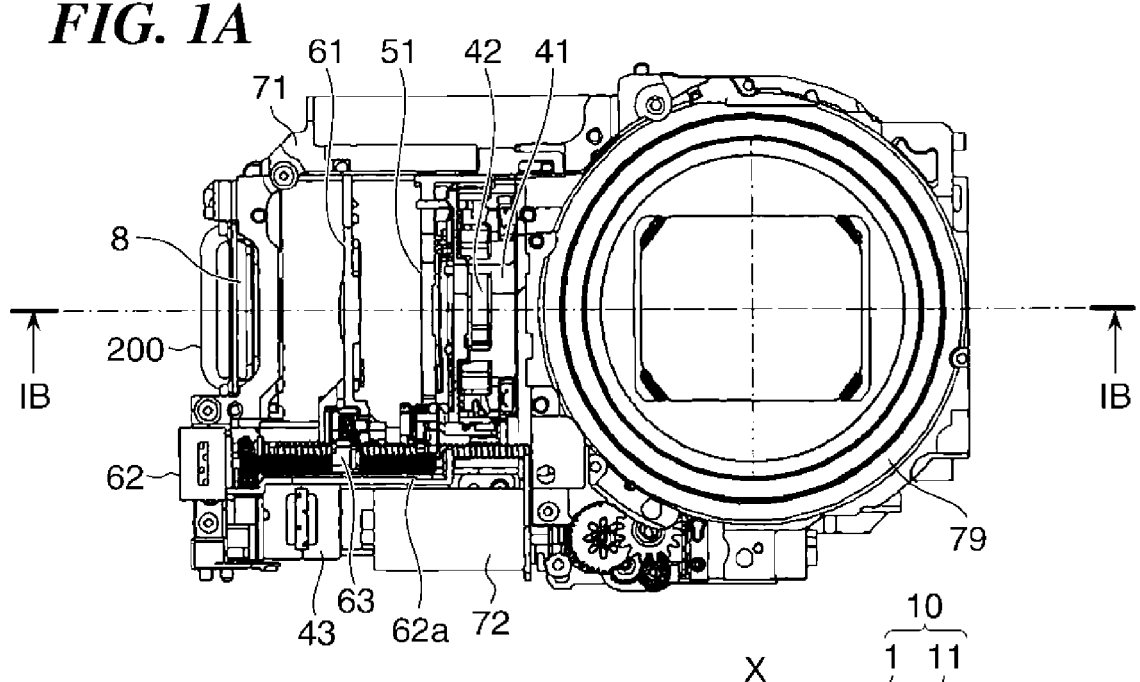
FIG. 1A is a front view, as seen from an object side, showing a lens barrel of a digital camera that serves as an image pickup apparatus according to one embodiment of this invention in a state where the lens barrel is at a WIDE position (wide-angle position)
Figure 1B:
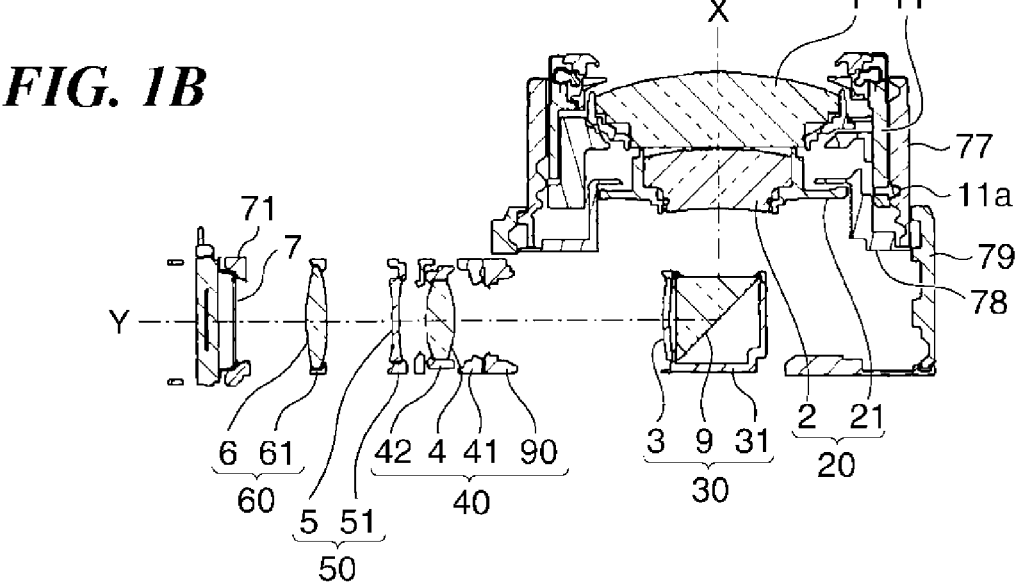
FIG. 1B is a section view of the lens barrel taken along line IB-IB in FIG. 1A.
Figure 2:
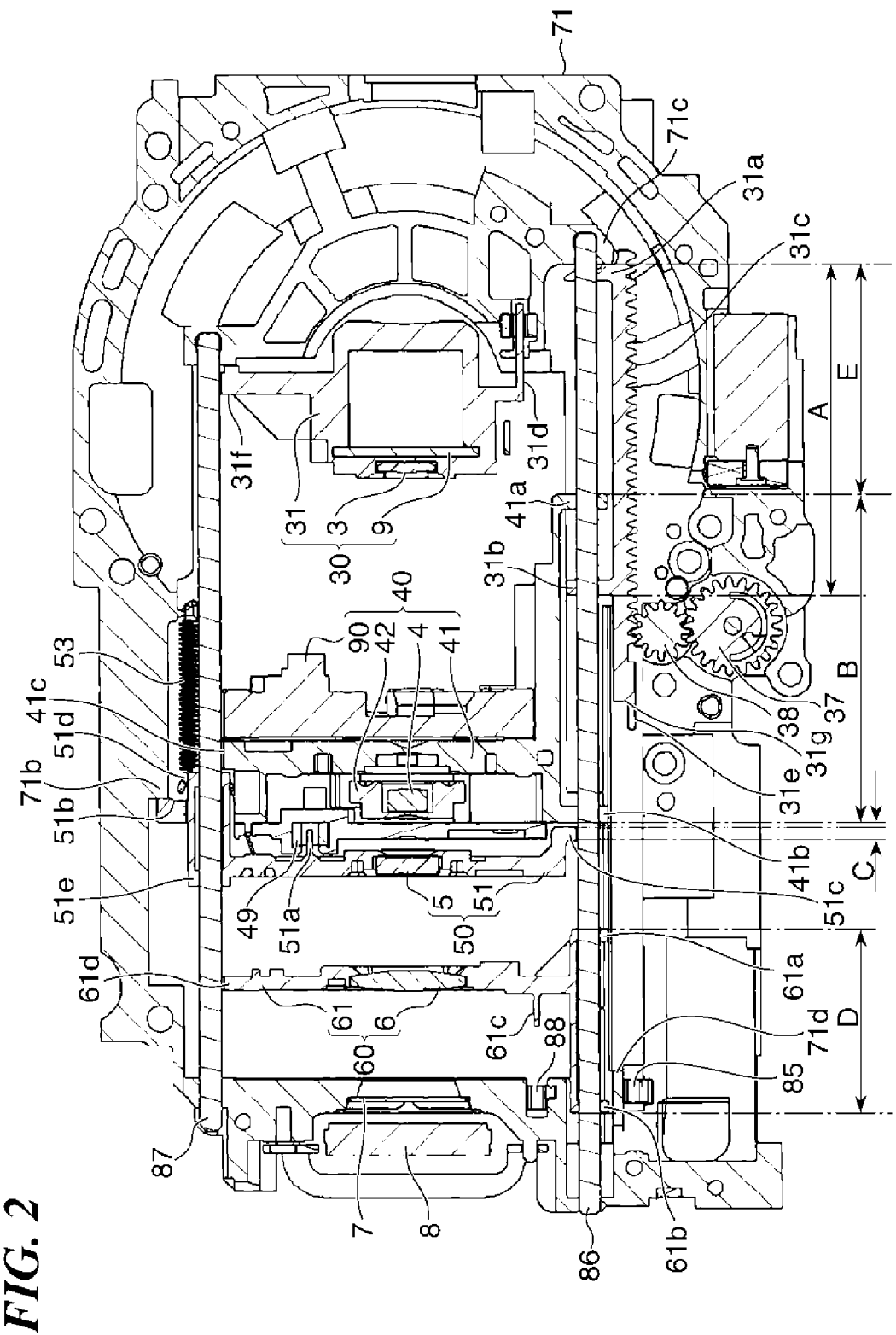
FIG. 2 is a section view taken along guide shafts of the lens barrel showing the lens barrel which is at the WIDE position.

FIG. 1A shows, in front view as seen from an object side, a lens barrel of a digital camera serving as an image pickup apparatus according to one embodiment in a state where the lens barrel is at a WIDE position (wide-angle position). FIG. 1B shows the lens barrel in section view taken along line IB-IB in FIG. 1A. FIG. 2 shows, in section view taken along guide shafts, the lens barrel which is at the WIDE position.

Referring to FIGS. 1 and 2, the digital camera of this embodiment includes a zoom lens barrel having a bending optical system and configured to be movable between a retracted position and a photographing position in an optical axis direction to change photographing magnification. The zoom lens barrel includes first to sixth lens groups 10 to 60, optical filter 7, imaging device package 8, barrel base plate 71, cam barrel 77, rectilinear guide barrel 78, fixed barrel 79, and guide shafts 86, 87. The lens groups 10 to 60 constitute an optical system that forms an image of object light on an imaging device (shown at 8a in FIG. 15), which is housed in the imaging device package 8.

The first lens group 10 is constituted by a first group barrel 11 and a first group lens 1 held by the first group barrel 11. The second lens group 20 is constituted by a second group barrel 21 and a second group lens 2 held by the second group barrel 21. These lens groups 10, 20 are each held by the cam barrel 77 and the rectilinear guide barrel 78 so as to be movable along an optical axis X.

Light flux incident from the first group lens 1 and passing through the second group lens 2 is conveyed in the optical axis X direction and bent by a prism 9 of the third lens group 30 to an optical axis Y direction perpendicular to the optical axis X, and is guided to an imaging surface of the imaging device 8a. Between the imaging device package 8 and the prism 9, a third group lens 3, aperture shutter 90, fourth to sixth group lenses 4 to 6, and optical filter 7 are disposed in this order along the optical axis Y.

The third group lens 3 and the prism 9 are held by the prism retainer member 31. The prism retainer member 31 has sliding portions 31a, 31b that are formed into a sleeve and provided on a side close to the guide shaft 86 at a distance (shown by symbol A in FIG. 2) from each other, and has a sliding portion 31f provided on a side close to the guide shaft 87. The prism retainer member 31 is supported at the sliding portions 31a, 31b, and 31f so as to be movable along the guide shafts 86, 87 in the optical axis Y direction.

The third group lens 3 and the prism 9 are movable along the optical axis Y in unison with the prism retainer member 31, and cooperate with the prism retainer member 31 to constitute the third lens group 30. When the lens barrel is at the WIDE position, the prism retainer member 31 moved closest to the object in the optical axis Y direction abuts against a stopper portion 71c of the barrel base plate 71.

The aperture shutter 90 is fixed to a fourth group base plate 41, and the fourth group lens 4 is held by a fourth group lens holder 42 that is supported by the base plate 41 so as to be movable by a minute distance in a plane perpendicular to the optical axis Y. The lens 4, base plate 41, lens holder 42, and aperture shutter 90 constitute the fourth lens group 40.

The fourth lens group 40 is driven by a stepping motor 43 (FIG. 3) and moved forward and rearward along the optical axis Y for a zooming operation. The fourth group lens holder 42 is controlled and moved by an actuator and a position detecting means (which are not shown) in a plane perpendicular to the optical axis Y to perform an optical anti-vibration operation. In this invention, it is not inevitably necessary to constitute an aperture and a shutter by the aperture shutter 90 and to perform optical anti-vibration in the fourth lens group 40.

The fourth group base plate 41 has sliding portions 41a, 41b that are formed into a sleeve and provided on a side close to the guide shaft 86 at a distance shown by symbol B in FIG. 2 from each other. The distance B is nearly equal to the distance A between the sliding portions 31a, 31b of the prism retainer member 31. The sliding portion 41a is always positioned between the sliding portions 31a, 31b. The fourth group base plate 41 has a sliding portion 41c provided on a side close to the guide shaft 87. When the lens barrel is at the WIDE position shown in FIG. 2, a distance E from the sliding portion 31a to the sliding portion 41a is smaller than the distance A.

The fifth group lens 5 is held by a fifth group lens holder 51 and cooperates with the lens holder 51 to constitute the fifth lens group 50. The lens holder 51 has sliding portions 51d, 51e formed into a sleeve and provided on a side close to the guide shaft 87, and a sliding portion 51c provided on a side close to the guide shaft 86. In FIG. 2, symbol C represents a thickness of the sliding portion 51c.

The fifth group lens holder 51 is supported at the sliding portions 51d, 51e, and 51c so as to be movable along the guide shafts 86, 87. The lens holder 51 is integrally formed with a light shield plate 51a for light-shielding a photointerrupter 49.

The sixth group lens 6 is held by a sixth group lens holder 61 and cooperates with the lens holder 61 to constitute the sixth lens group 60. The lens holder 61 has sliding portions 61a, 61b that are formed into a sleeve and provided on a side close to the guide shaft 86 at distance denoted by symbol D in FIG. 2 from each other, and has a sliding portion 61d provided on a side close to the guide shaft 87.

The sixth group lens holder 61 is supported at the sliding portions 61a, 61b and 61d so as to be movable along the guide shafts 86, 87. A screw 62a is driven to rotate by a focus motor 62 (comprised of a stepping motor) to move the sixth lens group 60 forwardly and rearwardly along the optical axis Y for zooming and focusing operations.

The optical filter 7 has a lowpass filter function for cutting light having a high spatial frequency and a function for cutting infrared light, and is held by the barrel base plate 71. The guide shafts 86, 87 are held by the barrel base plate 71 and extend from the third lens group 30 to the optical filter 7 in the optical axis Y direction.

The barrel base plate 71 holds the fixed barrel 79 and a gear train (described later) and is fixed with an imaging device package holder member 200 to which the imaging device package 8 incorporating the imaging device 8a is adhered and fixed. The details of the holder member 200 will be described later with reference to FIGS. 15 and 16.

Figure 3:
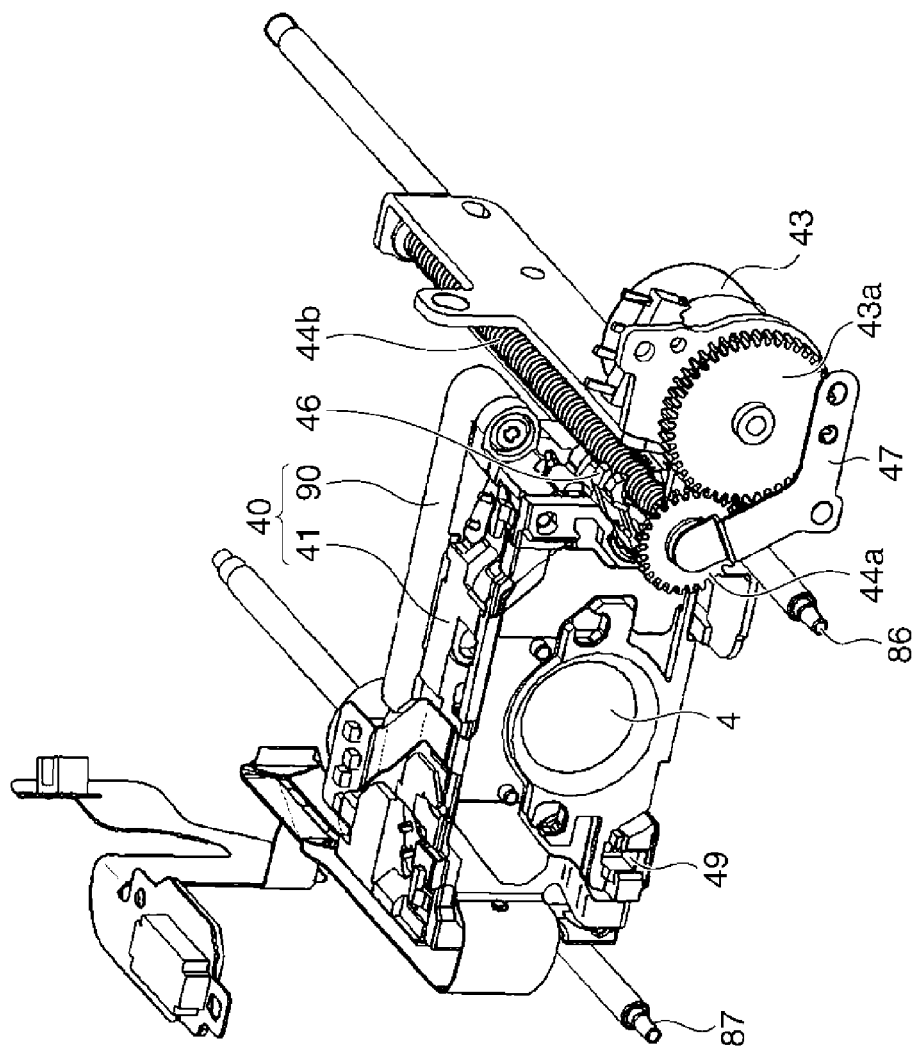
FIG. 3 is a perspective view showing a drive mechanism for a fourth lens group of the lens barrel.

FIG. 3 shows in perspective view a drive mechanism for the fourth lens group 40.

As shown in FIG. 3, a gear 43a mounted to an output shaft of the stepping motor 43 is in mesh with a gear 44a that is mounted to a screw 44b. The screw 44b is urged by a plate spring 47 and in mesh with a rack 46 mounted to the fourth group base plate 41 that is supported by the guide shafts 86, 87 so as to be movable along the optical axis Y.

When the gear 43a rotates with rotation of the stepping motor 43, the screw 44b that is integral with the gear 44a meshing with the gear 43a rotates, and the rack 46 meshing with the screw 44b moves in the optical axis Y direction. As a result, the fourth lens group 40 including the fourth group base plate 41 mounted with the rack 46 moves in the optical axis Y direction.

FIGS. 12A to 12C show, in schematic view, a state where a light receiving sensor of the photointerrupter 49 is light-shielded by the light shield plate 51a of the fifth group lens holder 51, a state where the light receiving sensor is partly light-shielded by the light shield plate 51a, and a state where the light receiving sensor is not light-shielded by the light shield plate 51a, respectively.

The photointerrupter 49 detects a position of the fourth group lens 4 relative to the fifth group lens 5. When the distance between the fourth and fifth group lenses 4, 5 decreases to a predetermined distance, light from a light emitting element of the photointerrupter 49 is intercepted by the light shield plate 51a so as not to enter the light receiving sensor 49a, as shown in FIG. 12A. As a result, an electrical output of the light receiving sensor 49a changes, thereby detecting that the distance between lenses 4, 5 decreases to the predetermined distance.

As shown in FIG. 2, the fifth group lens holder 51 includes an arm portion 51b extending from a sleeve portion that includes the aforesaid sliding portions 51d, 51e. The arm portion 51b can abut against a stopper portion 71b formed in the barrel base plate 71. The lens holder 51 is urged by a tension spring 53 stretched between the barrel base plate 71 and the lens holder 51 toward the third lens group 30 in the optical axis Y direction. At the time of photographing by the digital camera, the arm portion 51b of the lens holder 51 abuts against the stopper portion 71b of the barrel base plate 71.

When the screw 62a rotates with rotation of the focus motor 62 shown in FIG. 1, the sixth lens group 60 including the sixth group lens holder 61 that is mounted with a sixth group rack 63 meshing with the screw 62a moves in the optical axis Y direction.

As shown in FIG. 2, a light shield plate 61c is integrally formed on the sixth group lens holder 61. A photointerrupter 88 is attached to the barrel base plate 71 and has a light receiving sensor (not shown) whose electrical output is switched according to a positional relation between the photointerrupter 88 and the light shield plate 61c, thereby detecting a position of the sixth group lens holder 61.

As previously described, the sixth group lens holder 61 has the sliding portions 61a, 61b provided on the guide shaft 86 side so as to be spaced apart from each other. These sliding portions 61a, 61b constitute both ends of a sleeve portion (on the guide shaft 86 side) of the sixth group lens holder 61. Since it is preferable that a length of the sleeve portion is made as long as possible, the distance D between the sliding portions 61a, 61b is made longer as much as possible.

Next, with reference to FIGS. 9 to 11, a description will be given of how the prism retainer member 31 is driven to move the third lens group 30 along the guide shafts 86, 87.

Figure 9:
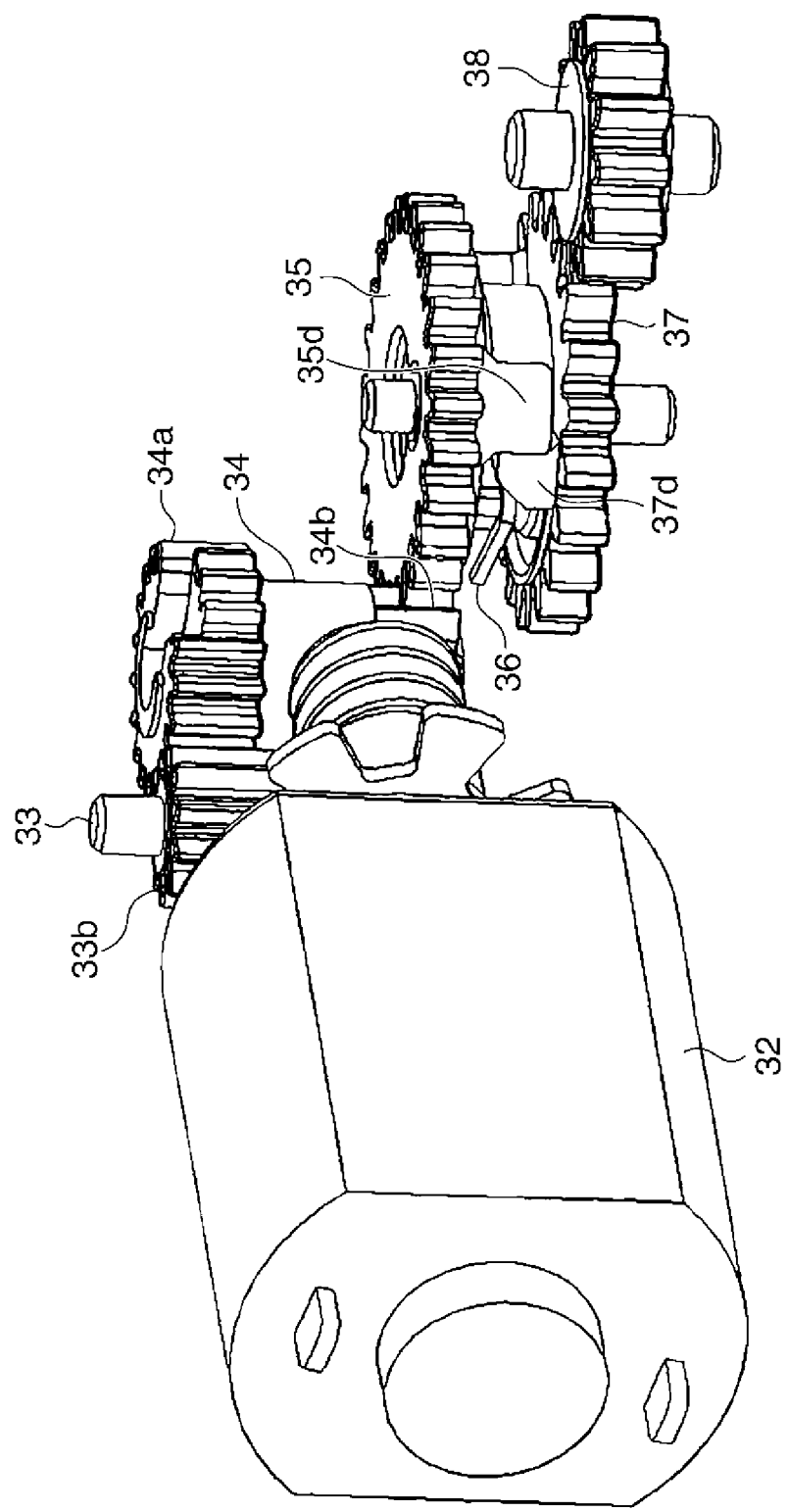
FIG. 9 is a perspective view showing a prism drive unit that drives a prism retainer member of the lens barrel.
Figure 10:
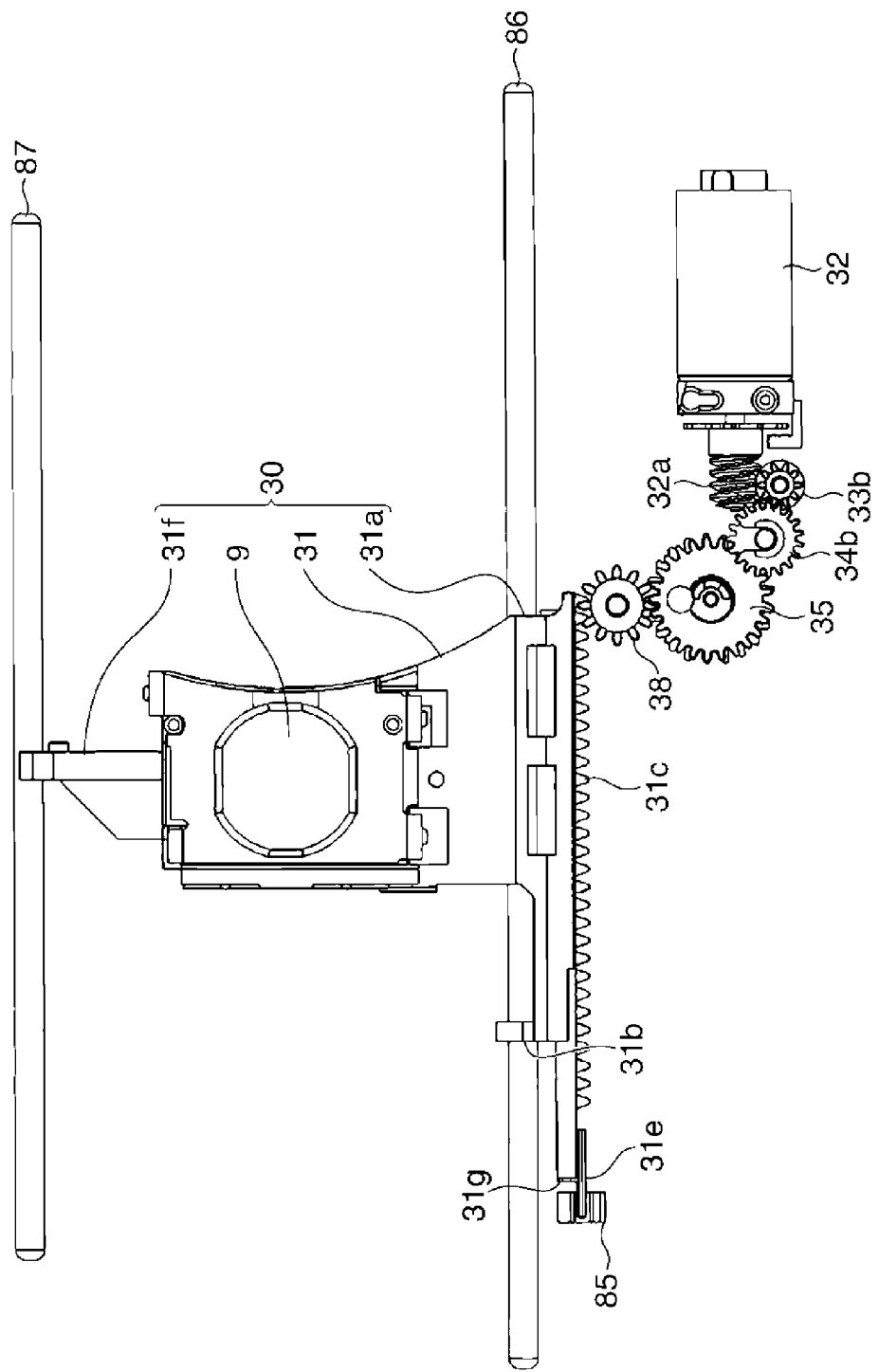
FIG. 10 is a plan view showing the prism retainer member and the prism drive unit.

FIG. 9 shows in perspective view a prism drive unit that drives the prism retainer member 31, and FIG. 10 shows in plan view the prism retainer member 31 and the prism drive unit.

As shown in FIGS. 9 and 10, a worm gear 32a is press-fitted to a motor shaft of the prism motor 32 and in mesh with a helical gear that is fixed to a gear shaft 33. A spur gear 33b fixed to the gear shaft 33 is in mesh with a spur gear 34a fixed to a gear shaft 34, and a spur gear 34b fixed to the gear shaft 34 is in mesh with a prism gear 35 that is fixed to a prism gear shaft 35d by which a prism delay gear 37 having a stopper 37d is rotatably supported. The prism delay gear 37 is in mesh with a prism drive gear 38. The prism gear 35, torsion spring 36, and prism delay gear 37 are disposed in this order as seen from the object side.

In a sleeve portion of the prism retainer member 31 extending between the aforesaid sliding portions 31a and 31b, a rack gear 31c is formed for engagement with the prism drive gear 38 and extends to near a stopper portion 31g.

Figure 11A:
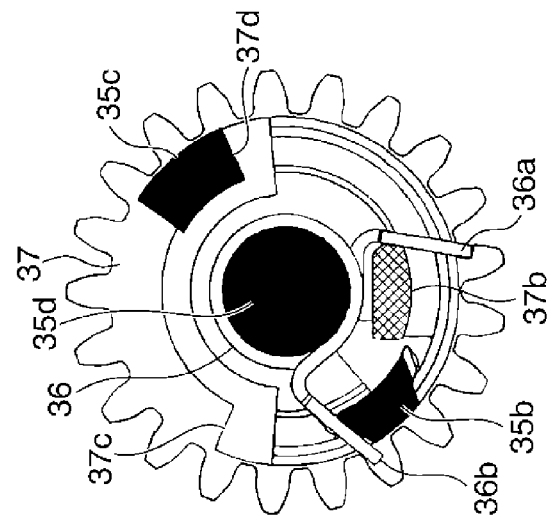
FIGS. 11A to 11C are views each showing a phase relation between a prism gear and a prism delay gear in the prism drive unit.
Figure 11B:
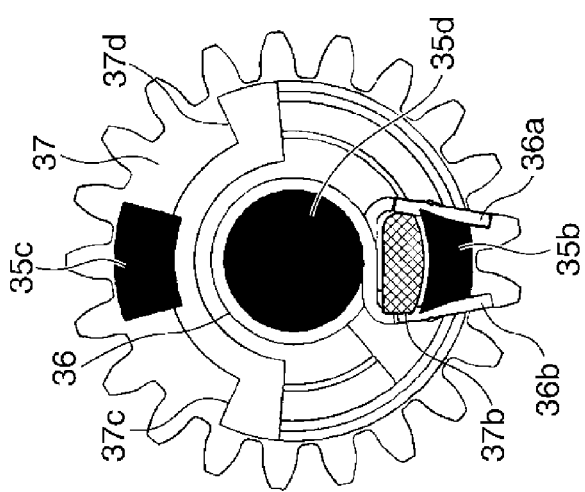
Figure 11C:
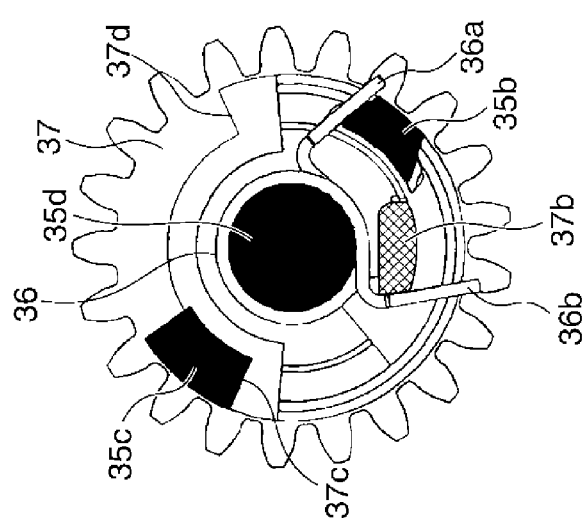

FIGS. 11A to 11C each show a phase relation between the prism gear 35 and the prism delay gear 37.

As shown in FIGS. 11A to 11C, the prism gear 35 is formed with an engagement portion 35b and the prism delay gear 37 is formed with an engagement portion 37b that is disposed radially inward of the engagement portion 35b.

The torsion spring 36 has a coil portion disposed centrally thereof and arm portions 36a, 36b extending radially outward from both ends of the coil portion. The torsion spring 36 is assembled into the prism drive unit shown in FIG. 9 by engaging the arm portions 36a, 36b of the spring 36 respectively with the engagement portion 35b of the prism gear 35 and the engagement portion 37b of the prism delay gear 37 in a state where the engagement portions 35b, 37b are in phase with each other as shown in FIG. 11B. Upon assembly into the prism drive unit, the torsion spring 36 is precharged.

When the engagement portions 35b, 37b are in phase with each other and the prism delay gear 37 is freely rotatable, the torsion spring 36 and the prism delay gear 37 rotate with rotation of the prism gear 35. When the prism delay gear 37 rotates, the prism drive gear 38 rotates and the prism retainer member 31 moves along the optical axis Y since, as previously described, the rack gear 31c of the prism retainer member 31 is in mesh with the prism drive gear 38 meshing with the prism delay gear 37.

On the other hand, in a state that the lens barrel is at the WIDE position as shown in FIG. 2, the prism retainer member 31 abuts against the stopper portion 71c of the barrel base plate 71 and the prism retainer member 31 is prevented from being moved, thereby preventing the prism delay gear 37 from rotating. In such a state, only the prism gear 35 rotates, while overcharging the torsion spring 36.

Subsequently, with rotation of the prism gear 35, the stopper 35c of the prism gear 35 is brought in abutment with the stopper 37c of the prism delay gear 37 as shown in FIG. 11A or brought in abutment with the stopper 37d of the prism delay gear 37 as shown in FIG. 11C, whereby rotation of the prism gear 35 is stopped.

When the lens barrel is at a photographing position, e.g., at the WIDE position, the state shown in FIG. 11A is attained where the stopper 35c of the prism gear 35 abuts against the stopper 37c of the prism delay gear 37. On the other hand, when the lens barrel is at a SINK position (retracted position) described later, the stopper portion 31g of the prism retainer member 31 abuts against the stopper portion 71d of the barrel base plate 71 and the state shown in FIG. 11C is attained where the stopper 35c of the prism gear 35 abuts against the stopper 37d of the prism delay gear 37.

Next, with reference to FIGS. 1, 8 and 13, a description will be given of the cam barrel 77, rectilinear guide barrel 78, and fixed barrel 79 of the lens barrel.

Figure 8:
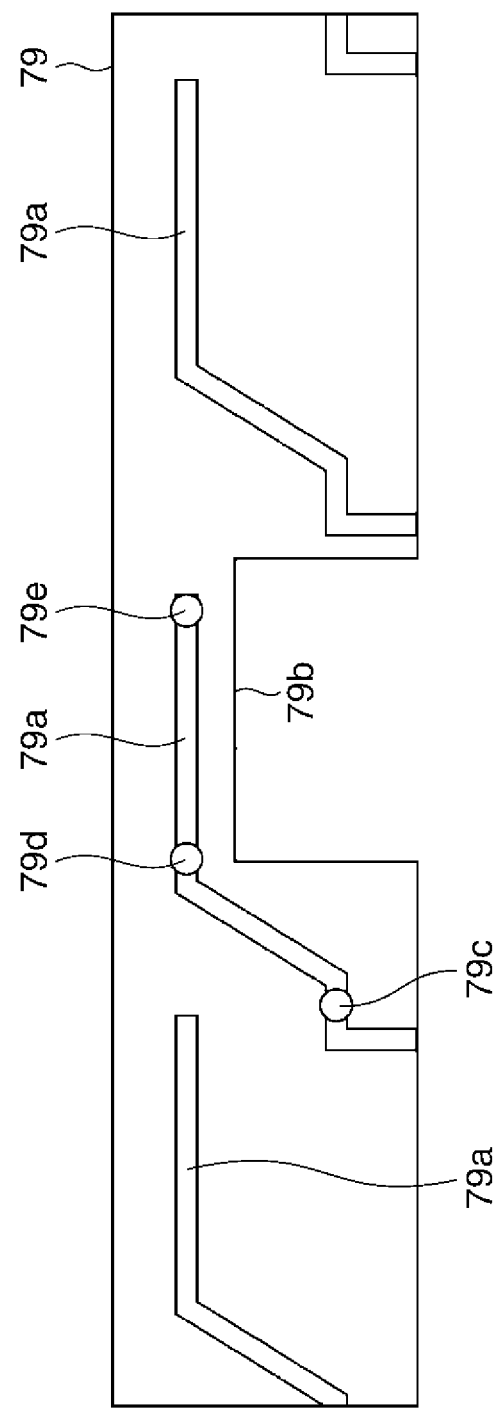
FIG. 8 is a development view showing an inner peripheral side of a fixed barrel of the lens barrel.
Figure 13:
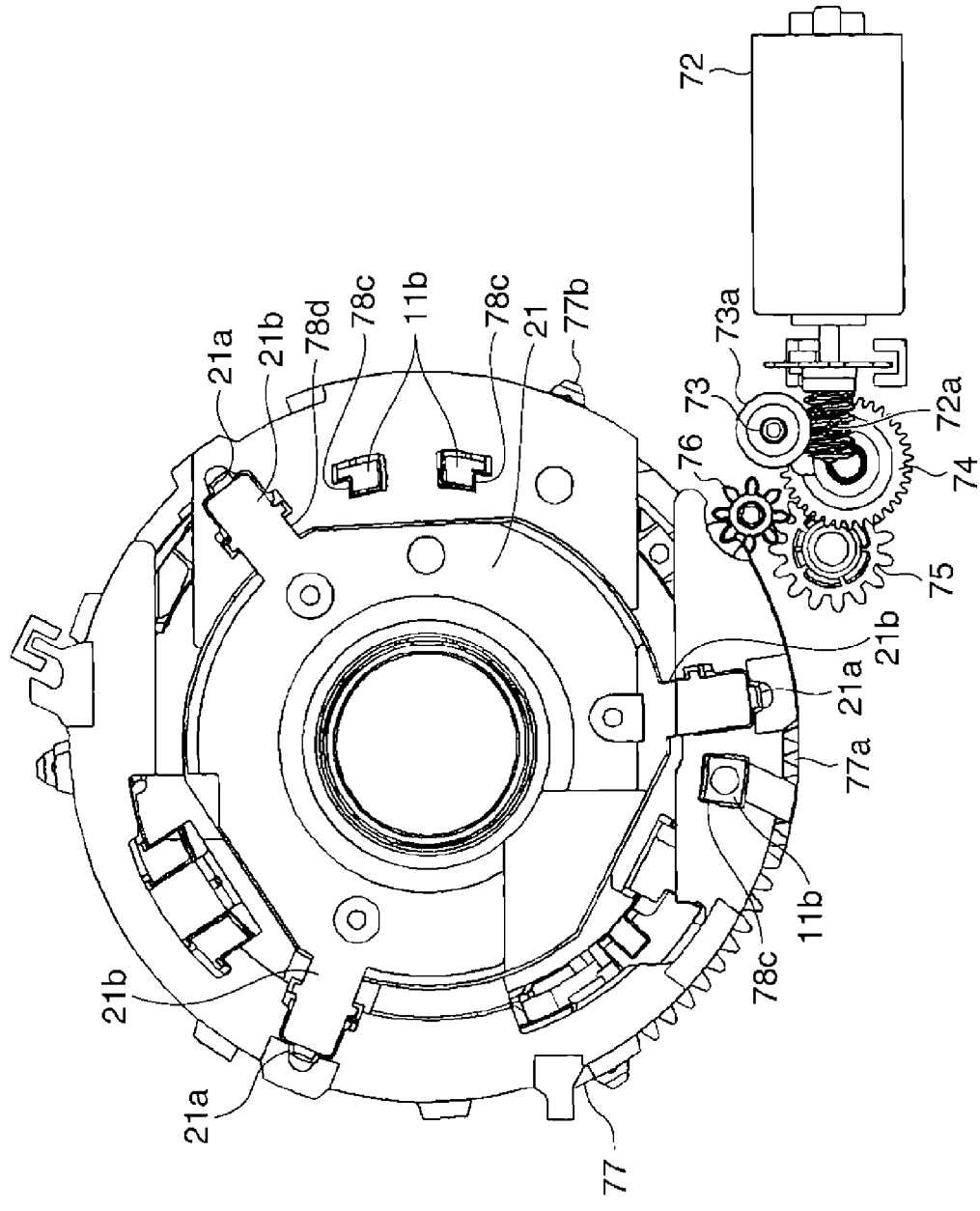
FIG. 13 is a plan view showing a cam barrel, zoom motor, and zoom gear train of the lens barrel.

FIG. 8 shows an inner peripheral side of the fixed barrel 79 in development view, and FIG. 13 shows in plan view the zoom motor 72, cam barrel 77, and zoom gear train.

As shown in FIG. 1B, the rectilinear guide barrel 78 is disposed on an inner peripheral side of the cam barrel 77 so as to be movable in the optical axis X direction in unison with the cam barrel 77, but unrotatable relative to the fixed barrel 79. The first group barrel 11 of the first lens group 10 disposed inside the cam barrel 77 is formed at its outer periphery with a cam pin 11a that is engaged with a first group cam groove (not shown) formed in the inner periphery of the cam barrel 77.

As shown in FIG. 8, cam grooves 79a with which cam pins formed on the outer periphery of the cam barrel 77 are engaged are formed circumferentially at substantially equal intervals in the inner periphery of the fixed barrel 79. The fixed barrel 79 is formed at its rear end portion with a notch 79b through which the prism retainer member 31 passes when the prism retainer member 31 moves forwardly and rearwardly in the optical axis Y direction.

As shown in FIG. 13, the rectilinear guide barrel 78 is formed at its outer periphery with a rectilinear groove 78c that extends in the optical axis X direction, and the first group barrel 11 is formed at its inner periphery with a protrusion 11b. The first group barrel 11 is prevented from rotating by engagement of the protrusion 11b with the rectilinear groove 78c.

The second group barrel 21 of the second lens group 20 disposed on the inner periphery side of the rectilinear guide barrel 78 is formed with a cam pin 21a that is engaged with a second group cam groove (not shown) formed on the inner periphery of the cam barrel 77, and an engagement portion 21b is formed at a root of the cam pin 21a. The rectilinear guide barrel 78 is formed with a penetration groove 78d that extends in the optical axis X direction. The second group barrel 21 is prevented from rotating by engagement of the engagement portion 21b with the penetration groove 78d.

With rotation of the cam barrel 77, the first group barrel 11 forwardly or rearwardly moves relative to the cam barrel 77 along the optical axis X by a cam function between the first group cam groove of the cam barrel 77 and the cam pin of the first group barrel 11, while the protrusion 11b of the first group barrel 11 moves along the rectilinear groove 78c of the rectilinear guide barrel 78. As a result, the cam barrel 77 forwardly or rearwardly moves relative to the fixed barrel 79 along the optical axis X, so that the first group lens 1 moves between the retracted position and the photographing position. As with the case of the first group lens 1, the second group lens 2 moves between the retracted position and the photographing position.

Next, a description will be given of a cam barrel drive mechanism that moves the first and second lens groups 10 and 20.

A zoom motor 72, which is a drive source of the cam barrel drive mechanism, has a motor shaft that extends in the optical axis Y direction. A worm gear 72a press-fitted to the motor shaft of the zoom motor 72 is in mesh with a helical gear 73a fixed to a gear shaft 73.

A spur gear (not shown) fixed to the gear shaft 73 is in mesh with one of gears (not shown) fixed to a gear shaft 74. Another one of the gears fixed to the gear shaft 74 is engaged through an idler gear 75 with a drive gear 76, which is in turn engaged with a gear portion 77a formed in the outer periphery of the cam barrel 77.

When the cam barrel 77 is rotatably driven by the zoom motor 72 through gears (not shown) fixed to the gear shafts 73, 74, idler gear 75, drive gear 76, and gear portion 77a of the cam barrel 77, the cam barrel 77 moves forwardly or rearwardly along the optical axis X by the cam function between the cam grooves 79a of the fixed barrel 79 (see FIG. 8) and the cam pins of the cam barrel 77.

When the zoom motor 72 is rotated, e.g., in the direction to forwardly move the cam barrel 77, the cam pins of the cam barrel 77 move along the cam grooves 79a of the fixed barrel 79 to the right in FIG. 8, to thereby move the cam barrel 77 forwardly in the optical axis X direction, whereby a housing space is formed in which the prism retainer member 31 can be housed.

Figure 4A:
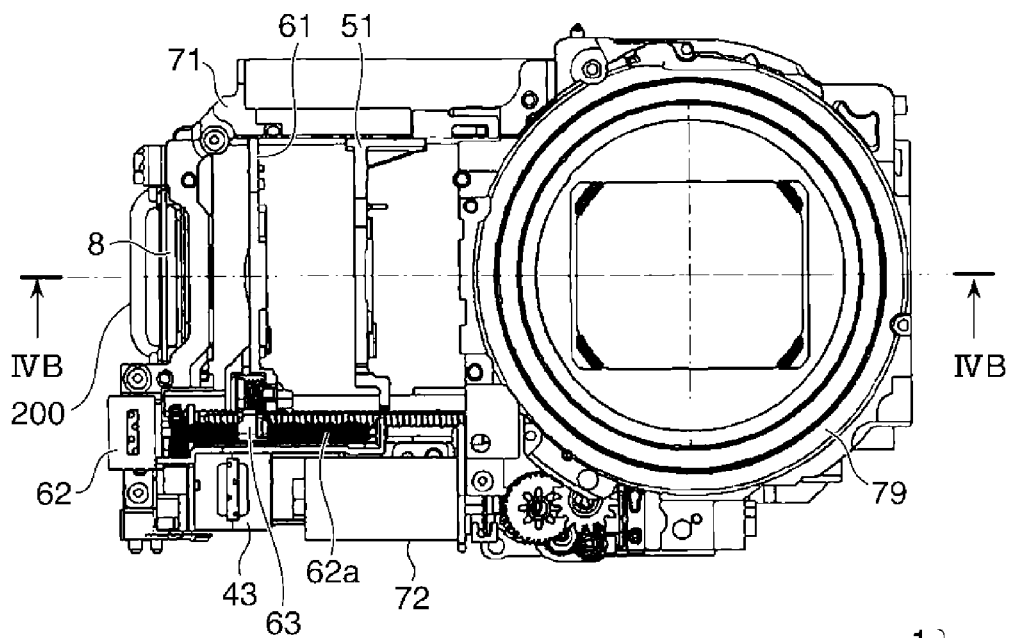
FIG. 4A is a front view, as seen from the object side, of the lens barrel which is at a TELE position (telephoto position)
Figure 4B:
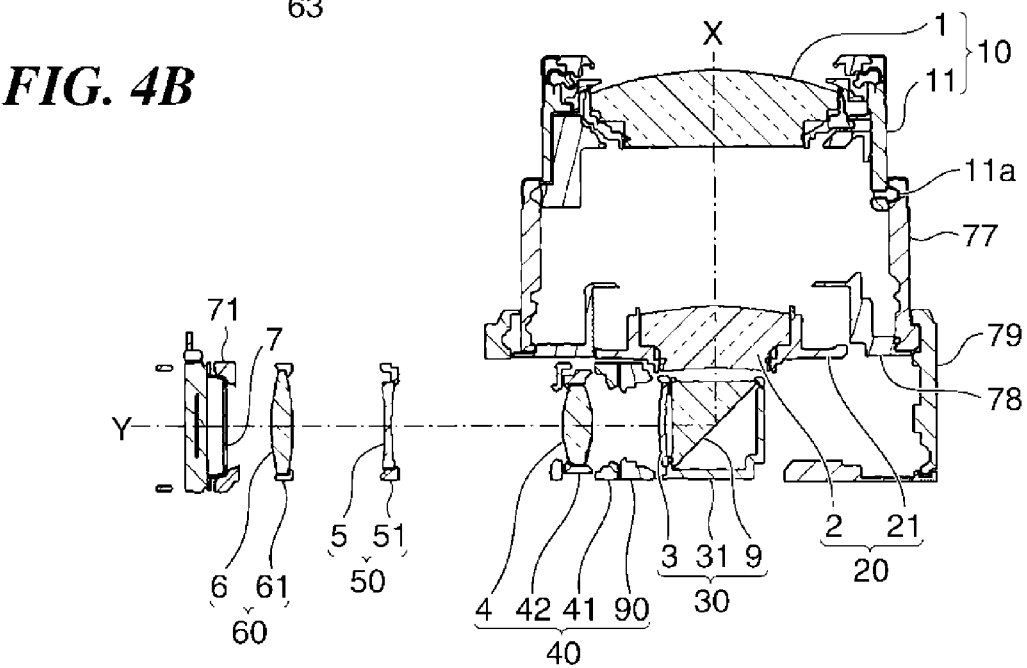
FIG. 4B is a section view of the lens barrel taken along line IVB-IVB in FIG. 4A.
Figure 5:
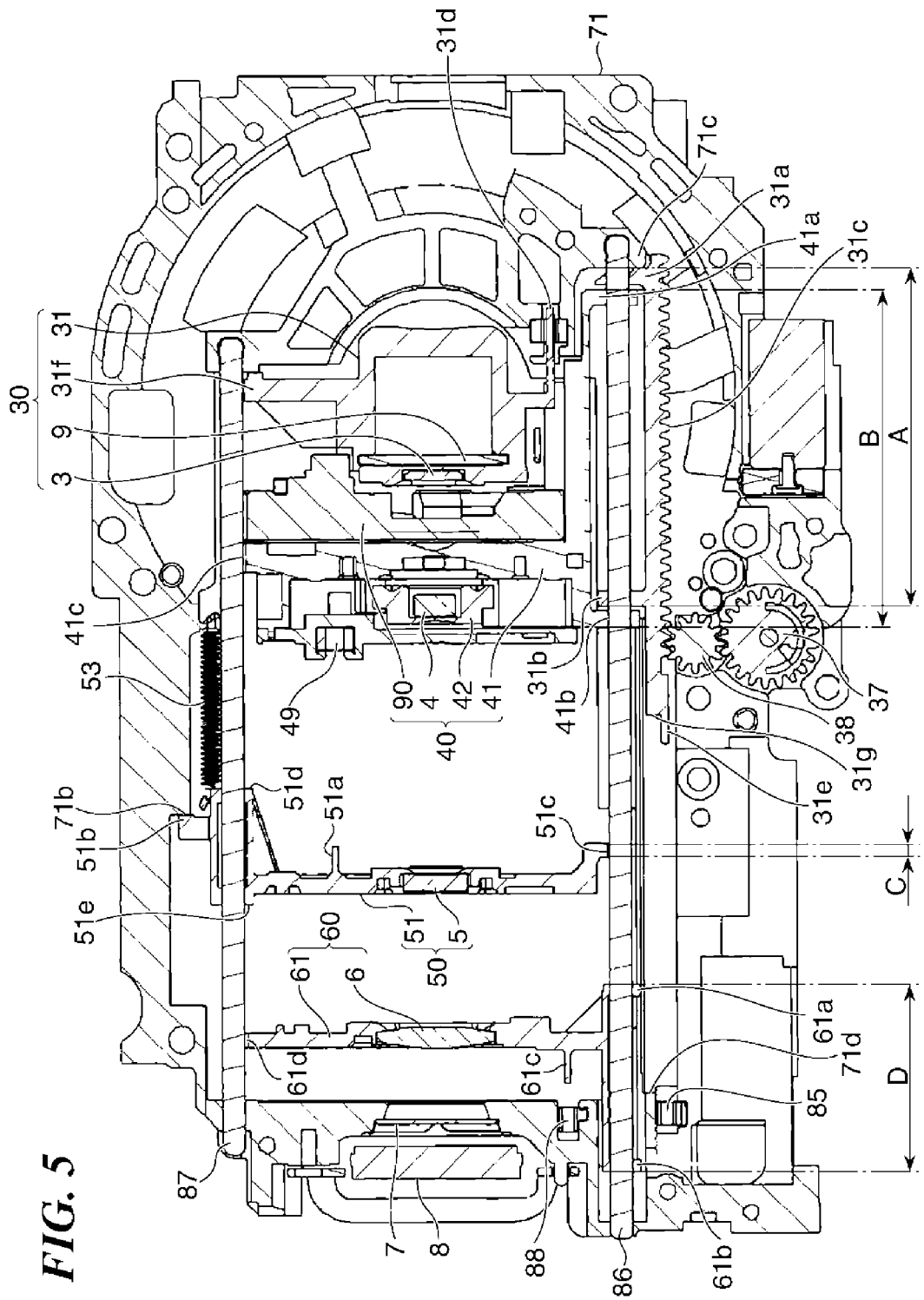
FIG. 5 is a section view taken along the guide shafts showing the lens barrel which is at the TELE position.

FIG. 4A shows, in front view as seen from the object side, the lens barrel which is at a TELE position (telephoto position), and FIG. 4B shows the lens barrel in section view taken along line IVB-IVB in FIG. 4A. FIG. 5 shows the lens barrel, which is at the TELE position, in cross section taken along the guide shafts 86, 87.

In a state where the lens barrel is at the TELE position as shown in FIGS. 4 and 5, the first lens group 10 has moved forwardly toward the object in the optical axis X direction, and the second lens group 20 moved rearwardly in the optical axis X direction has stopped at a position close to the prism 9. The fourth lens group 40 driven by the stepping motor 43 to move toward the prism 9 in the optical axis Y direction has stopped at a position close to the third lens group 30.

The fifth lens group 50 abutted against the stopper 71b of the barrel base plate 71 has stopped moving. The sixth lens group 60 driven by the focus motor 62 to move toward the imaging device package 8 in the optical axis Y direction has stopped at a position close to the optical filter 7.

Figure 6A:
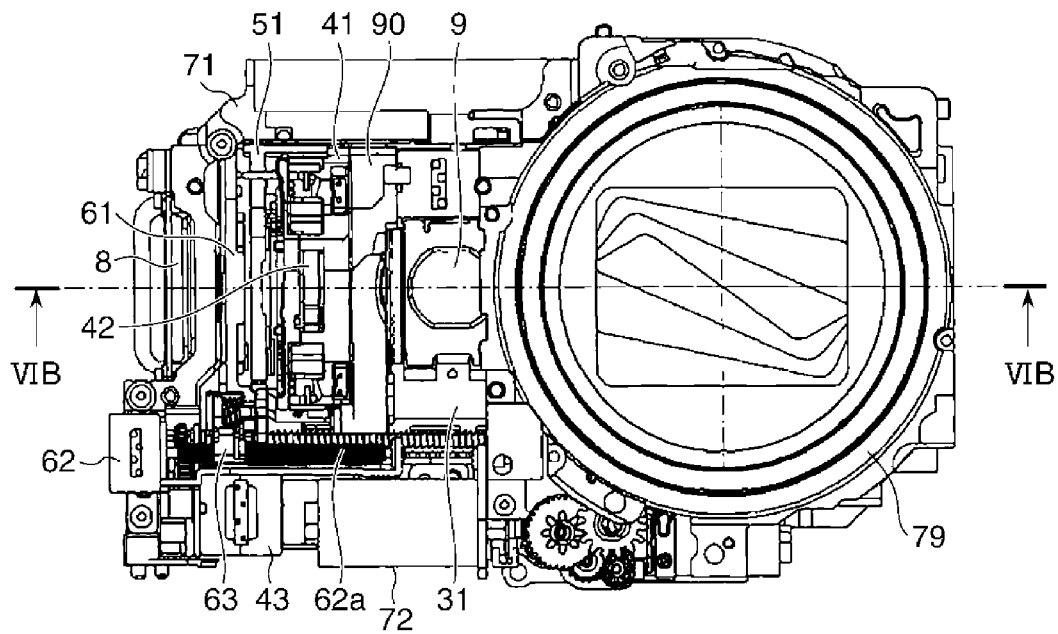
FIG. 6A is a front view, as seen from the object side, of the lens barrel which is at a SINK position (retracted position)
Figure 6B:
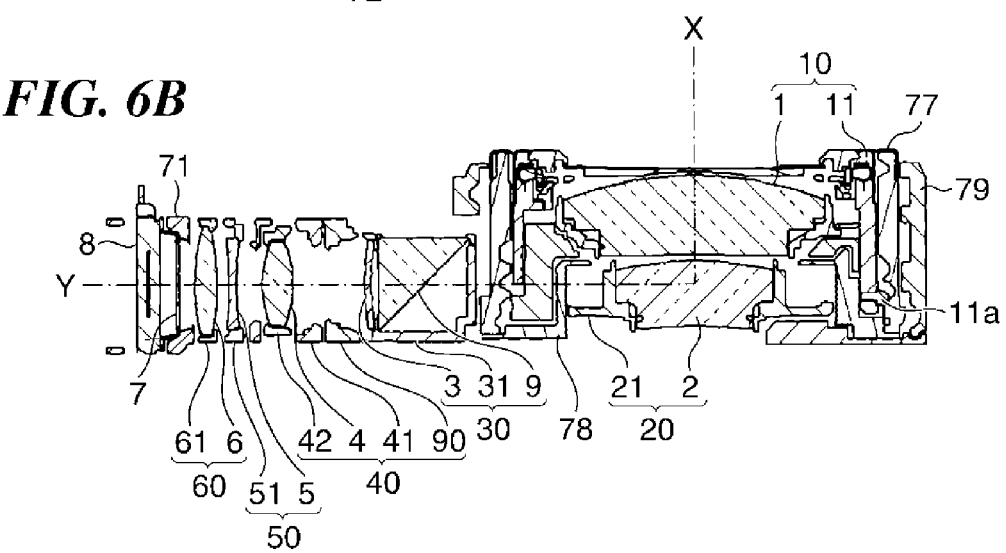
FIG. 6B is a section view of the lens barrel taken along line VIB-VIB in FIG. 6A.
Figure 7:
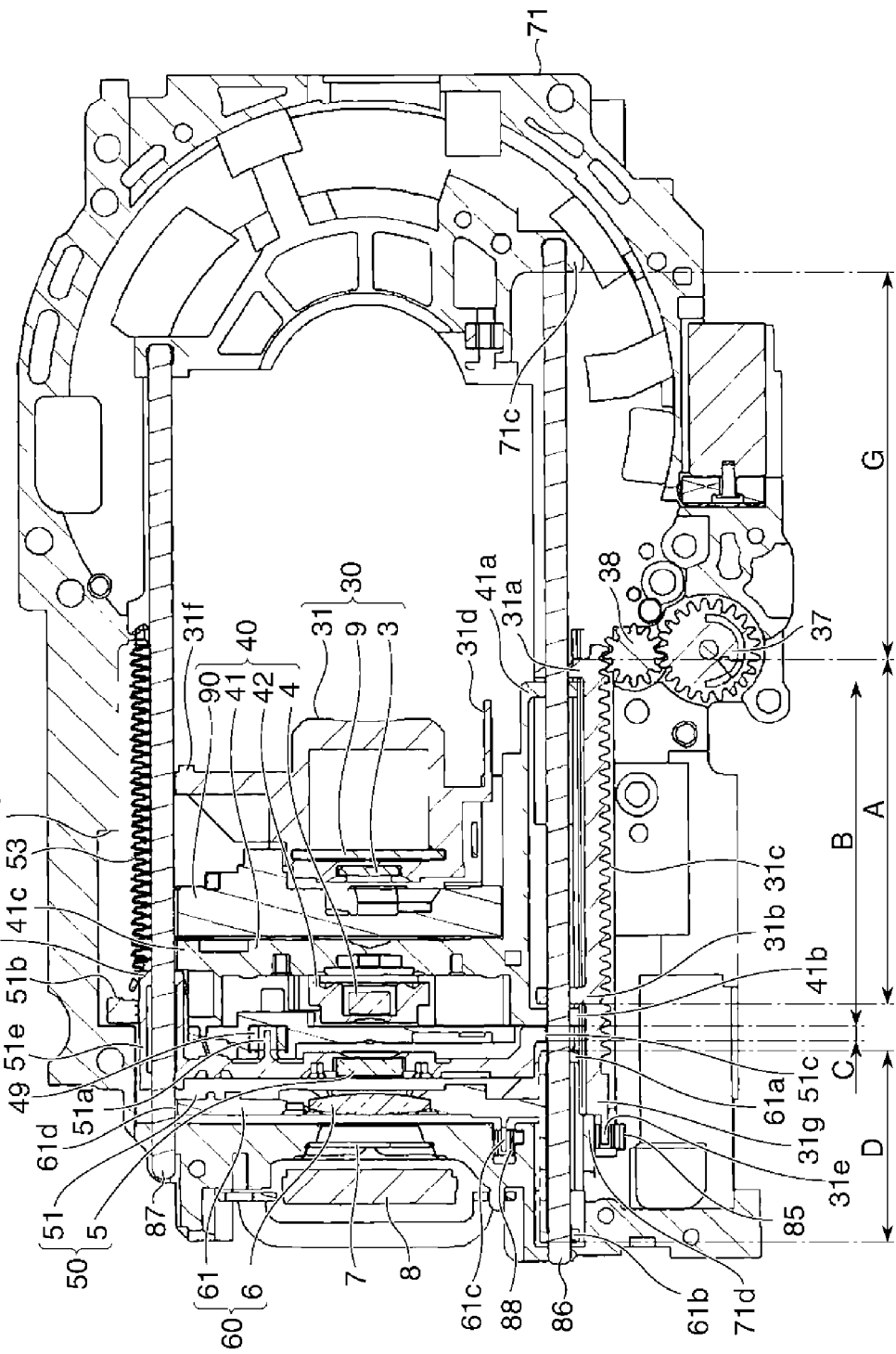
FIG. 7 is a section view taken along the guide shafts showing the lens barrel which is at the SINK position.

FIG. 6A shows, in front view as seen from the object side, the lens barrel which is at a SINK position (retracted position), and FIG. 6B shows the lens barrel in section view taken along line VIB-VIB in FIG. 6A. FIG. 7 shows, in section view taken along the guide shafts, the lens barrel which is at the SINK position.

In a state where the lens barrel is at the SINK position as shown in FIGS. 6 and 7, the third to sixth lens groups 30 to 60 have moved toward the imaging device package 8 along the optical axis Y, and the first and second lens groups 10, 20 have been housed in the housing space formed on the side opposite from the object in the optical axis X direction. In this state, the cam pins of the cam barrel 77 are at the positions 79c in the cam grooves 79a (shown in FIG. 8) of the fixed barrel 79, and the fifth lens group 50 pressed by the fourth lens group 40 toward the imaging surface in the optical axis Y direction has moved rearwardly to the SINK position.

The light receiving sensor of the photointerrupter 49 remains light-shielded by the light shield plate 51a of the fifth group lens holder 51 when the lens barrel is in a moving section from the WIDE position (wide-angle position) to the SINK position (retracted position). The light receiving sensor of the photointerrupter 88 is light-shielded by the light shield plate 61c of the sixth group lens holder 61 rearwardly moved to the SINK position. The light receiving sensor of the photointerrupter 85 is light-shielded by the light shield plate 31e of the prism retainer member 31. Based on outputs of the photointerrupters 85 and 88, it is possible to detect that the lens barrel is at the SINK position. Symbol G shown in FIG. 7 represents a distance from the sliding portion 41a of the fourth group base plate 41 to the stopper portion 71c of the barrel base plate 71. The distance G is larger than the distance A between the sliding portions 31a, 31b of the prism retainer member 31.

When the lens barrel is at the SINK position, the phase relation shown in FIG. 11C is achieved between the prism gear 35 and the prism delay gear 37, and the torsion spring 36 is overcharged. Thus, the prism retainer member 31 is urged by a charged force of the torsion spring 36 toward the retracted side (imaging device package 8 side) in the optical axis Y direction. On the other hand, the stopper portion 31g of the prism retainer member 31 abuts against the stopper portion 71d of the barrel base plate 71 as shown in FIG. 7, whereby the prism retainer member 31 is prevented from moving in the retracted direction.

Next, a description will be given of an operation sequence where the lens barrel is moved from the SINK position to the WIDE position.

To move the lens barrel to the WIDE position, the zoom motor 72 is rotated in the direction to forwardly move the cam barrel 77, thereby moving the cam pins of the cam barrel 77 from positions 79c to positions 79d in the cam grooves 79a (FIG. 8) of the fixed barrel 79.

In a lift section where the cam pins of the cam barrel 77 are moved from the positions 79c to the positions 79d in the cam grooves 79a, the first and second lens groups 10 and 20 forwardly move along the optical axis X. When the cam barrel 77 has reached the WIDE position, i.e., when the cam pins of the cam barrel 77 has reached the positions 79d in the cam grooves 79a, the zoom motor 72 is stopped rotating.

After the start of forward movement of the first and second lens groups 10, 20 with rotation of the zoom motor 72, the prism motor 32 (FIG. 9) is driven to rotate the prism gear 35 in a direction to forwardly move the prism retainer member 31 toward the WIDE position. When the prism gear 35 and the prism delay gear 37 are in the phase relation shown in FIG. 11C, the torsion spring 36 is overcharged and the prism delay gear 37 remains stopped rotating. Accordingly, the prism retainer member 31 does not move from the retracted position.

When the engagement portion 35b of the prism gear 35 and the engagement portion 37b of the prism delay gear 37 become in phase with each other as shown in FIG. 11B with the rotation of the prism gear 35, the prism delay gear 37 starts rotating in unison with the prism gear 35 and the prism retainer member 31 starts moving toward the WIDE position.

When the prism retainer member 31 reaches the WIDE position, the prism retainer member 31 is brought in abutment with the stopper portion 71c (FIG. 7) of the barrel base plate 71 and stops moving. At the same time, the prism delay gear 37 stops rotating. On the other hand, the prism motor 32 is continued to be driven, and the prism gear 35 further rotates. Subsequently, the phase relation shown in FIG. 11A is achieved between the prism gear 35 and the prism delay gear 37, so that the torsion spring 36 becomes a predetermined overcharged state and the prism motor 32 is stopped.

It is advantageous to overcharge the torsion spring 36 to urge the prism retainer member 31 toward the stopper portion 71c of the barrel base plate 71 in that the prism retainer member 31 can be stabilized in position and orientation at the time of photographing.

Concurrently with the aforesaid driving of the prism motor 32 to move the prism retainer member 31 from the SINK position to the WIDE position, the stepping motor 43 (FIG. 6) is driven to move the fourth lens group 40. Since being urged by the tension spring 53 toward the fourth lens group 40 as shown in FIG. 7, the fifth lens group 50 can move in unison with the fourth lens group 40. The fifth lens group 50 moves with movement of the fourth lens group 40 until the arm portion 51b abuts against the stopper portion 71b of the barrel base plate 71, and stops moving when the arm portion 51b abuts against the stopper portion 71b. Thereafter, the fourth lens group 40 continues moving and stops moving at a predetermined position in the optical axis Y direction.

The sixth lens group 60 can move between the position where the fifth lens group 50 stops moving and the SINK position where the light receiving sensor of the photointerrupter 88 is light-shielded by the light shield plate 61c of the sixth group lens holder 61. The sixth lens group 60 is driven by the focus motor 62 from the SINK position toward the object in the optical axis Y direction, and stops moving at an in-focus position.

To move the lens barrel from the WIDE position to the SINK position, operations are performed that are reverse to those performed in the case of moving the lens barrel from the SINK position to the WIDE position. First, the focus motor 62 is driven to move the sixth lens group 60 toward the package 8 in the optical axis Y direction. When the light receiving sensor of the photointerrupter 88 is shielded by the light shield plate 61c of the sixth group lens holder 61 and the output of the light receiving sensor is switched, the sixth lens group 60 is stopped moving.

Next, the prism motor 32 is driven to rotate the prism gear 35 in the direction to rearwardly move the prism retainer member 31 to the retracted position. When the prism gear 35 has rotated by a predetermined amount of overcharge of the torsion spring 36, the engagement portion 35b of the prism gear 35 and the engagement portion 37b of the prism delay gear 37 become in phase with each other as shown in FIG. 11B. Thereafter, the prism gear 35 rotates in unison with the prism delay gear 37 and the torsion spring 36, and the prism retainer member 31 rearwardly moves to the retraction direction.

Concurrently with the aforesaid driving of the prism motor 32 to move the prism retainer member 31 to the retracted position, the stepping motor 43 is started to be driven, whereby the fourth lens group 40 moves toward the package 8 in the optical axis Y direction and is brought in abutment with the fifth lens group 50. Thereafter, by the drive of the stepping motor 43, the fourth lens group 40 is caused to retract in unison with the fifth lens group 50 toward the package 8 along the optical axis Y.

After the fourth and fifth lens groups 40, 50 have retracted, the prism retainer member 31 is moved to the retracted position. When the prism retainer member 31 abuts against the stopper portion 71d of the barrel base plate 71, the retainer member 31 stops moving and at the same time, the prism delay gear 37 stops rotating. The prism motor 32 is continued to rotate while overcharging the torsion spring 36. When a predetermined overcharged state of the torsion spring 36 is attained, the prism motor 32 stops rotating.

When the prism retainer member 31 has moved to the retracted position and a housing space in which the first and second lens groups 10, 20 can be housed has been formed, the zoom motor 72 is driven to backwardly move the cam barrel 77. Subsequently, the cam pins of the cam barrel 77 move from positions 79d to positions 79c in the cam grooves 79a of the fixed barrel 79. When the cam barrel 77 has retracted to the SINK position and the first and second lens groups 10, 20 have been housed in the housing space, the zoom motor 72 is stopped rotating.

In the following, a description will be given of a zooming operation of the lens barrel between the WIDE and TELE positions. As previously described, when the lens barrel is at the WIDE position, the prism retainer member 31 abuts against the stopper portion 71c of the barrel base plate 71 and the cam pins of the cam barrel 77 are at the positions 79d in the cam grooves 79a of the fixed barrel 79.

To perform a zooming operation of the lens barrel from the WIDE position to the TELE position, the zoom motor 72 is driven to rotate the cam barrel 77 so as to move the cam pins of the cam barrel 77 from positions 79d to positions 79e in the cam grooves 79a of the fixed barrel 79, thereby moving the first and second lens groups 10, 20 in the optical axis X direction. The prism motor 32 is not driven since the prism retainer member 31 remains in abutment with the stopper portion 71c of the barrel base plate 71 and is at the photographing position. Then, the stepping motor 43 is driven to move the fourth lens group 40. At the same time, the focus motor 62 is driven to move the sixth lens group 60 to an in-focus position.

To perform a zooming operation of the lens barrel from the TELE position to the WIDE position, the cam barrel 77 is rotated by the zoom motor 72 so as to move the cam pins of the cam barrel 77 from the positions 79e to the positions 79d in the cam grooves 79a of the fixed barrel 79. The prism retainer member 31 is not moved, but the fourth lens group 40 is moved by the stepping motor 43 and the sixth lens group 60 is moved to an in-focus position by the focus motor 62.

Next, with reference to FIGS. 14 to 18, a description will be given of an example construction of an imaging device holding unit of the digital camera.

Figure 14:
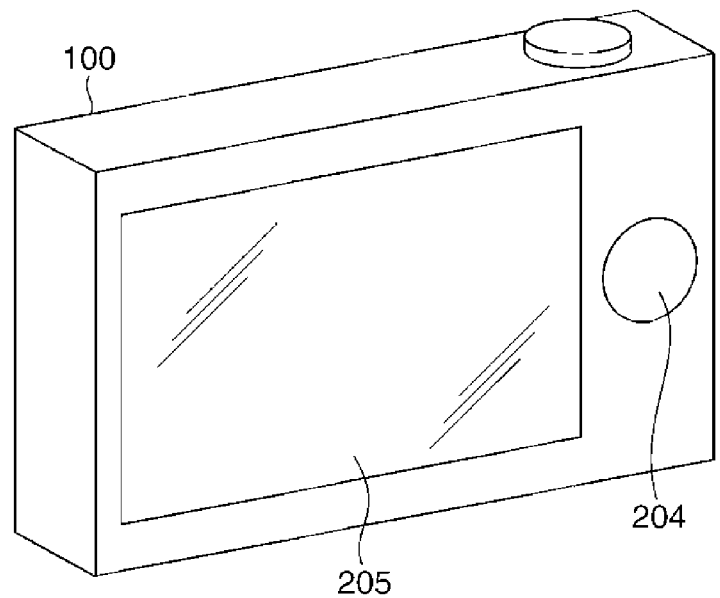
FIG. 14 is a perspective view of the digital camera as seen from a photographer side.
Figure 15:
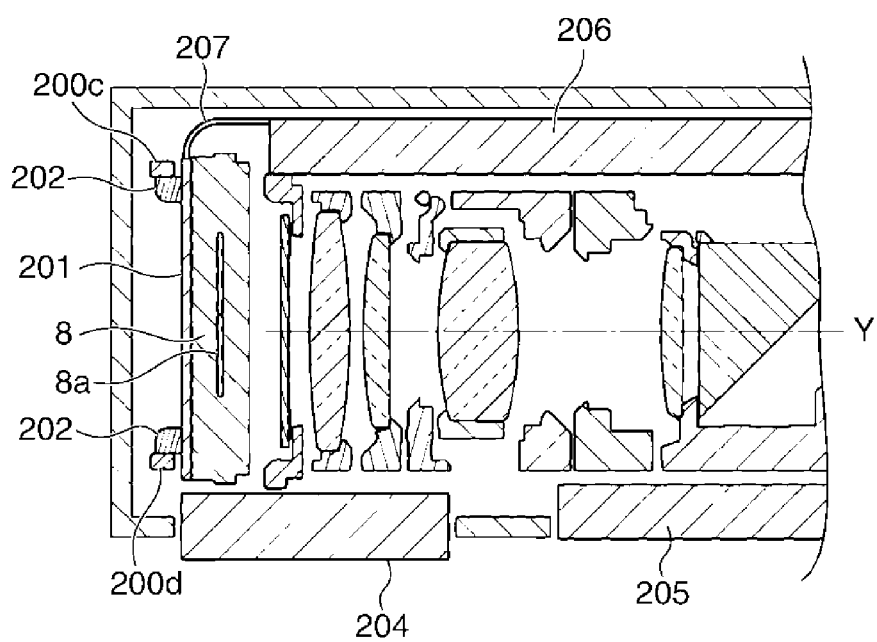
FIG. 15 is a fragmentary section view showing the lens barrel which is at the SINK position and its peripheral elements.
Figure 16:
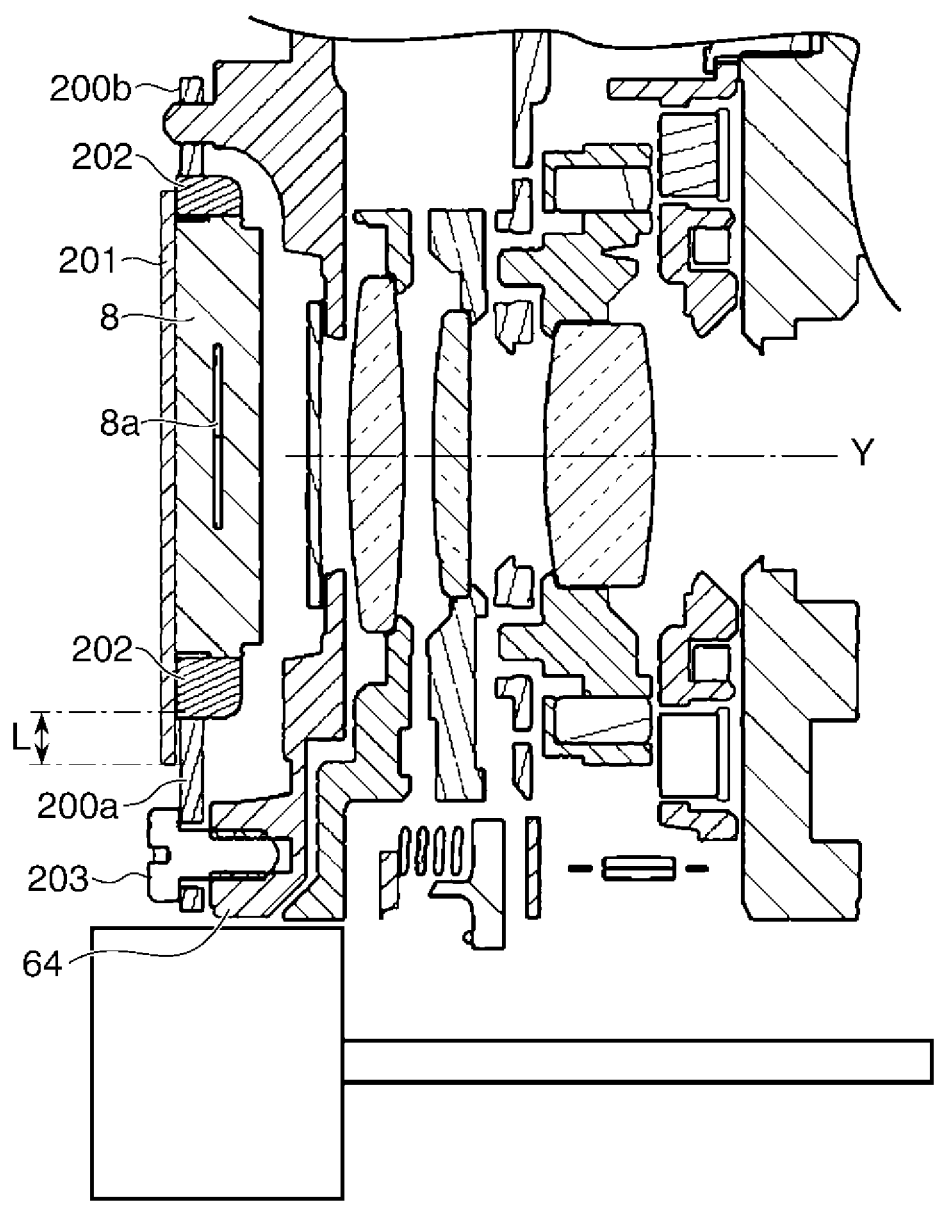
FIG. 16 is a fragmentary enlarged section view showing the lens barrel which is at the SINK position and its peripheral elements.
Figure 17:
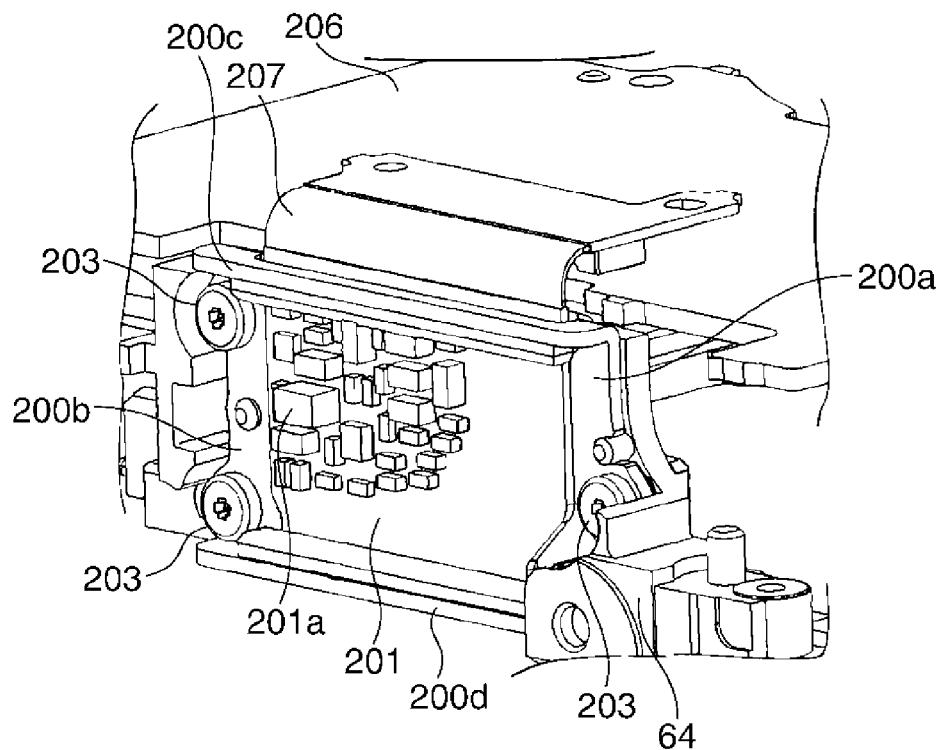
FIG. 17 is a perspective view of an imaging device package holder member of the digital camera as seen from a side opposite from an object side.
Figure 18:
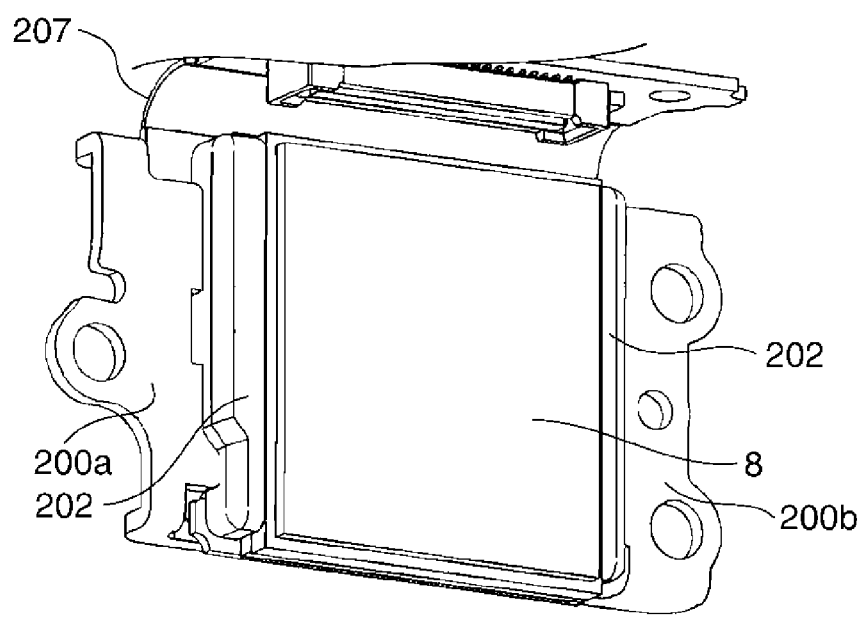
FIG. 18 is a perspective view of the package holder member as seen from the object side.

FIG. 14 shows the digital camera in perspective view as seen from a photographer side. FIGS. 15 and 16 show in section view the lens barrel which is at the SINK position (retracted position) and its peripheral elements. FIG. 17 shows in perspective view an imaging device package holder member of the digital camera as seen from a side opposite from an object side, and FIG. 18 shows in perspective view the package holder member as seen from the object side.

As shown in FIG. 14, the digital camera (denoted by reference numeral 100) has a rear side provided with an operation member 204 that enables a user/photographer to select a function of the camera 100 and a liquid crystal panel 205 that enables the user/photographer to confirm in advance an image photographed by the camera 100.

The imaging device holding unit of this embodiment, which is used together with the above-described lens barrel, is mainly constituted by the imaging device package holder member, which is shown by reference numeral 200 in FIG. 1 and which will be hereinafter referred to as the holder member.

As shown in FIGS. 15 to 18, the holder member 200 is fixed to a zoom body 64 of the digital camera 100 by means of adhesive 202 and fixing screws 203, and the imaging device package 8 is held by the holder member 200.

An imaging sensor board 201 disposed adjacent to the imaging device package 8 is mounted with component parts 201a that constitute an image processing circuit for processing an image signal (output signal) output from the imaging device 8a housed in the package 8.

A main board 206 is disposed on a front surface side of the digital camera 100 and adjacent to the lens barrel. The main board 206 is mounted with, e.g., a CPU for controlling respective parts of the digital camera 100, and connected through a flexible printed circuit board 207 to the imaging sensor board 201.

As shown in FIGS. 15 to 18, the holder member 200 has planar portions 200a, 200b that are respectively disposed on both sides of the optical axis Y, and has raised bent portions 200c, 200d that are respectively disposed on the both sides of the optical axis Y, and is formed into a rectangular frame shape as a whole.

As shown in FIG. 16, the planar portions 200a, 200b of the holder member 200 extend parallel to or substantially parallel to an outer surface of the imaging device package 8 and are disposed in the same or substantially the same plane as the outer surface of the package 8. In other words, the planar portions 200a, 200b are disposed parallel to or substantially parallel to the imaging device 8a.

As shown in FIGS. 17 and 19, the raised bent portions 200c, 200d of the holder member 200 are formed by raising and bending two side portions of the holder member 200 in a thickness direction of the imaging device 8a. The raised bent portions 200c, 200d support the package 8 at locations different from those where the planar portions 200a, 200b support the package 8. As shown in FIG. 15, one of the raised bent portions of the holder member 200 (in the illustrated example, raised bent portion 200c) is located on the front surface side (object side) of the digital camera 100, and another of the raised bent portions (in the illustrated example, raised bent portion 200d) is located on the rear surface side (photographer side) of the digital camera 100.

Adhesive 202 is applied to gaps between the imaging device package 8 and the planar portions 200a, 200b of the holder member 200, whereby the planar portions 200a, 200b are adhered and fixed to the package 8. Adhesive 202 is also applied to between the imaging sensor board 201 and the raised bent portions 200c, 200d, whereby the raised bent portions 200c, 200d are adhered and fixed to the imaging sensor board 201.

As shown in FIGS. 17 and 19, the planar portions 200a, 200b have their one ends on a side close to the flexible printed circuit board 207 that are coupled to each other through the raised bent portion 200c, and have their other ends on a side opposite from the flexible printed circuit board 207 that are coupled to each other through the raised bent portion 200d.

As shown in FIG. 15, the holder member 200 is disposed such that the raised bent portion 200c overlaps with one end portion of the imaging device package 8 and one end portion of the imaging sensor board 201, which are on the camera's front surface side, and such that the raised bent portion 200d overlaps with another end portion of the package 8 and another end portion of the imaging sensor board 201, which are on the camera's rear surface side.

More specifically, as seen in the camera's thickness direction, the raised bent portion 200c of the holder member 200 has its outer surface located inside an end surface of the package 8 and an end surface of the imaging sensor board 201, which are on the camera's front surface side, and the raised bent portion 200d of the holder member 200 has its outer surface located inside an end surface of the package 8 and an end surface of the imaging sensor board 201, which are on the camera's rear surface side. In other words, a width of the holder member 200 in a direction between the raised bent portions 200c, 200d is smaller than a width of the package 8 in the same direction as the direction between the raised bent portions 200c, 200d. The raised bent portions 200c, 200d of the holder member 200 are therefore disposed so as to be overlapped with and inside the imaging device package 8 as seen in the optical axis Y direction. As a result, the imaging device holding unit of the digital camera 100 can be made compact in size.

The planar portion 200a of the holder member 200 has a part shown by symbol L in FIG. 16, which is disposed to be overlapped with the imaging sensor board 201 as seen from the optical axis Y direction, whereby the gap between the planar portion 200a and the package 8 can be closed on the imaging sensor board 201 side, so that the planar portion 200a and the package 8 can be firmly adhered together by the adhesive 202.

Figure 19A:
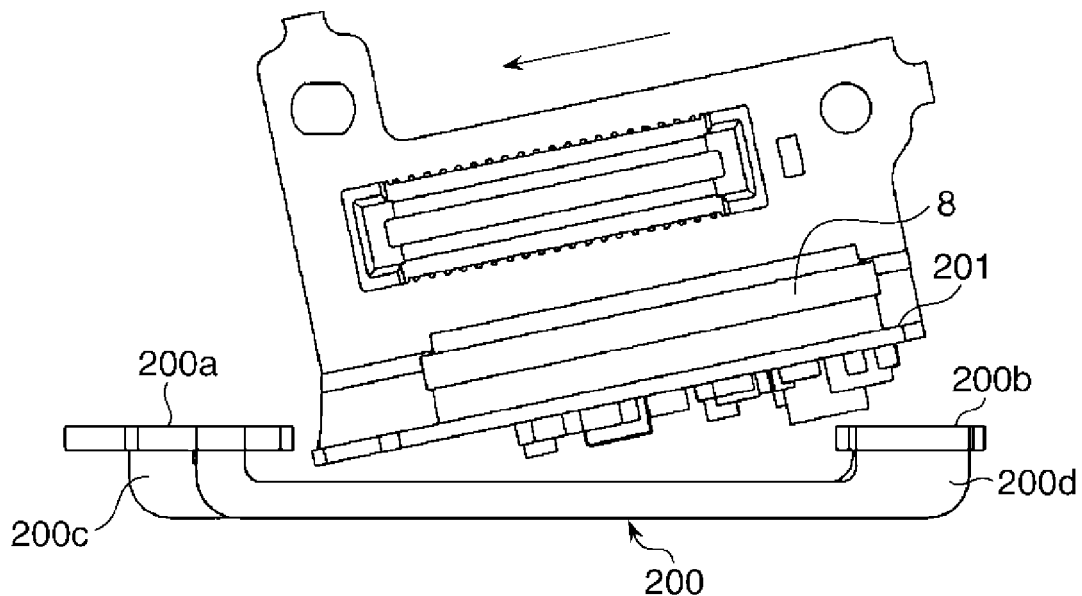
FIG. 19A is a view showing how an imaging sensor board mounted with an imaging device package is assembled into a holder member.
Figure 19B:
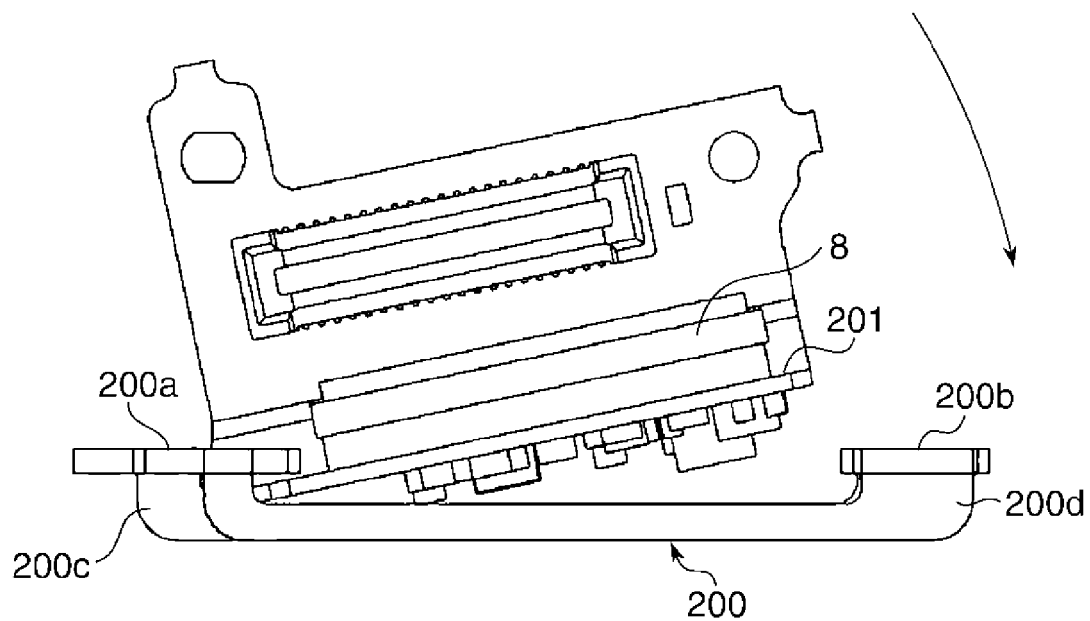
FIG. 19B is a view showing how the imaging sensor board mounted with the package is placed onto the holder member.

FIG. 19A shows how the imaging sensor board 201 mounted with the imaging device package 8 is assembled into the holder member 200, and FIG. 19B shows how the imaging sensor board 201 mounted with the package 8 is placed onto the holder member 200.

As previously described, the holder member 200 is configured such that at least part of the planar portion 200a (the part L in the illustrated example) is overlapped with the imaging sensor board 201. Accordingly, when an attempt is made to assemble the imaging sensor board 201 mounted with the package 8 into the inside of the holder member 200 from right above the holder member 200, the imaging sensor board 201 interferes with the part of the planar portion 200a of the holder member 200 and is prevented from being assembled into the inside of the holder member 200.

To obviate this, a part of the imaging sensor board 201 on the planar portion 200a side is obliquely inserted between the planar portion 200a and the raised bent portions 200c, 200d, as shown by arrow in FIG. 19A. Next, the imaging sensor board 201 mounted with the package 8 is tilted to a direction shown by arrow in FIG. 19B until the imaging sensor board 201 becomes parallel to the holder member 200, and is then placed in the inside of the holder member 200.

Next, the adhesive 202 is applied to gaps between the package 8 and the planar portions 200a, 200b of the holder member 200 from the lens barrel side (see FIG. 16). Furthermore, the adhesive 202 is applied to between the imaging sensor board 201 and the raised bent portions 200c, 200d of the holder member 200 from the side opposite from the lens barrel (see FIG. 15). Since the adhesive 202 is applied from both the front and rear sides of the holder member 200, the holder member 200 and the package 8 are firmly adhered together and the holder member 200 and the imaging sensor board 201 are also firmly adhered together.

Next, the operation member 204 is disposed adjacent to the raised bent portion 200d of the holder member 200 as shown in FIG. 15, and the flexible printed circuit board 207 is disposed adjacent to the raised bent portion 200c of the holder member 200.

As described above, according to this embodiment, the holder member 200 is disposed such that the raised bent portions 200c, 200d are located on the side opposite from the lens barrel with respect to the package 8 and overlapped with both end portions of the package 8 in the camera's thickness direction as seen from the optical axis Y direction, so that the holder member 200 is disposed inside the package 8 as seen from the optical axis Y direction. Accordingly, the imaging device holding unit of the digital camera 100 can be made compact in size, and even if the digital camera 100 is made compact, a free space is formed around the imaging device package 8. As a result, one or more camera structural members such as the operation member 204 and the flexible printed circuit board 207, other than the holder member 200, can be disposed around the imaging device package 8.

Furthermore, the holder member 200 is disposed such that at least part of the planar portion 200a is overlapped with the imaging sensor board 201 as seen from the optical axis Y direction, whereby the gap between the imaging device package 8 and the planar portion 200a of the holder member 200 can be closed on the imaging sensor board 201 side. As a result, the adherence strength between the holder member 200 and the package 8 can be increased.

Upon assembly of the digital camera 100, the adhesive is applied to the gaps between the imaging device package 8 and the planar portions 200a, 200b of the holder member 200 from the object side, and also applied to between the imaging sensor board 201 and the raised bent portions 200c, 200d of the holder member 200 from the side opposite from the object, whereby the adherence strength between the holder member 200 and the package 8 and the adherence strength between the holder member 200 and the imaging sensor board 201 can be increased.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2011-283636, filed Dec. 26, 2011, which is hereby incorporated by reference herein in its entirety.

What is claimed is:

1. An imaging device holding unit comprising:
an imaging device housed in a package;
an imaging board with a circuit that performs an image processing on an output signal of the imaging device;
a holder member configured to support the package housing the image device; and
a flexible circuit board connected to the imaging board,
wherein the holder member has:
    a planar portion disposed parallel to the imaging device; and
    a raised portion integral with the planar portion,
wherein the raised portion is disposed on a longitudinal side of the holder member,
wherein the imaging device is supported on the holder member, with the raised portion disposed overlapping the package, as seen from a direction of the optical axis,
wherein the flexible circuit board is disposed so that part of the flexible circuit board extends in a direction crossing the longitudinal side where the raised portion is disposed and bent outside of the raised portion, and
wherein an adhesive is disposed inside of the raised portion, between the imaging board and the raised portion.

2. The imaging device holding unit according to claim 1, wherein a width of the holder member in a direction between the raised portion is smaller than a width of the package in a same direction as the direction between the raised portion.

3. An image pickup apparatus comprising;
an imaging device housed in a package;
an imaging board with a circuit that performs an image processing on an output signal of the imaging device;
a holder member configured to support the package housing the imaging device; and
a flexible circuit board connected to the imaging board,
wherein the holder member has:
    a planar portion disposed parallel to the imaging device; and
    a raised portion integral with the planar portion,
wherein the raised portion is disposed on a longitudinal side of the holder member,
wherein the imaging device is supported on the holder member, with the raised portion disposed overlapping the package, as seen from a direction of the optical axis,
wherein the flexible circuit board is disposed so that part of the flexible circuit board extends in a direction crossing the longitudinal side where the raised portion is disposed and bent outside of the raised portion, and
wherein an adhesive is disposed inside of the raised portion, between the imaging board and the raised portion.

4. A lens barrel comprising:
an optical system disposed along an optical axis;
an imaging device housed in a package and configured to photoelectrically convert object light formed into an image by the optical system into an electrical signal;
an imaging board with a circuit that performs an image processing on an output signal of the imaging device;
a holder member configured to support the package housing the imaging device; and
a flexible circuit board connected to the imaging board,
wherein the holder member has:
    first and second planar portions disposed on opposite sides of the optical axis and facing each other, and parallel to the imaging device; and
    first and second raised portions coupling the first and second planar portions, wherein each of the first and second raised portions is disposed on a respective longitudinal side of the holder member,
wherein the imaging device is supported on the holder member, with the first and second raised portions disposed overlapping the package, as seen from a direction of the optical axis,
wherein the flexible circuit board is disposed so that part of the flexible circuit board extends in a direction crossing the longitudinal side where the first raised portion is disposed and bent outside of the first raised portion, and
wherein an adhesive is disposed inside of the first raised portion, between the imaging board and the first raised portion.

5. The lens barrel according to claim 4, wherein the holder member is disposed so that at least part of one of the first or second planar portion overlaps with the imaging board, as seen from the direction of the optical axis.

6. An image pickup apparatus comprising:
an optical system disposed along an optical axis;
an imaging device housed in a package and configured to photoelectrically convert object light formed into an image by the optical system into an electrical signal;
an imaging board with a circuit that performs an image processing on an output signal of the imaging device;
a holder member configured to support the package housing the imaging device; and
a flexible circuit board connected to the imaging board,
wherein the holder member has:
    first and second planar portions disposed on opposite sides of the optical axis and facing each other, and parallel to the imaging device; and
    first and second raised portions coupling the first and second planar portions,
wherein each of the first and second raised portions is disposed on a respective longitudinal side of the holder member,
wherein the imaging device is supported on the holder member, with the first and second raised portions disposed overlapping the package, as seen from a direction of the optical axis,
wherein the flexible circuit board is disposed so that part of the flexible circuit board extends in a direction crossing the longitudinal side where the first raised portion is disposed and bent outside of the first raised portion, and
wherein an adhesive is disposed inside of the first raised portion, between the imaging board and the first raised portion.

\* \* \* \* \*